(12) United States Patent
Li

(10) Patent No.: US 8,872,478 B2
(45) Date of Patent: Oct. 28, 2014

(54) CIRCUIT AND METHOD FOR BALANCING BATTERY CELLS

(75) Inventor: Guoxing Li, Sunnyvale, CA (US)

(73) Assignee: O2Micro Inc., Santa Clara, CA (US)

( * ) Notice: Subject to any disclaimer, the term of this patent is extended or adjusted under 35 U.S.C. 154(b) by 815 days.

(21) Appl. No.: 12/973,340

(22) Filed: Dec. 20, 2010

(65) Prior Publication Data

US 2011/0109269 A1 May 12, 2011

Related U.S. Application Data

(60) Provisional application No. 61/311,872, filed on Mar. 9, 2010.

(51) Int. Cl.
*H02J 7/02* (2006.01)
*H02J 7/00* (2006.01)

(52) U.S. Cl.
CPC ............................ *H02J 7/0016* (2013.01)
USPC .................... 320/122; 320/116; 320/118

(58) Field of Classification Search
USPC ........................................................ 320/122
See application file for complete search history.

(56) References Cited

U.S. PATENT DOCUMENTS

| | | | |
|---|---|---|---|
| 4,418,310 A | 11/1983 | Bollinger | |
| 5,268,630 A | 12/1993 | Bhagwat et al. | |
| 5,284,719 A | 2/1994 | Landau et al. | |
| 5,628,630 A | 5/1997 | Misch et al. | |
| 5,646,503 A | 7/1997 | Stockstad | |
| 5,648,717 A | 7/1997 | Uskali | |
| 5,652,501 A | 7/1997 | McClure et al. | |
| 5,656,915 A | 8/1997 | Eaves | |
| 5,680,027 A | 10/1997 | Hiratsuka et al. | |
| 5,691,742 A | 11/1997 | O'Connor et al. | |
| 5,710,501 A | 1/1998 | van Phuoc et al. | |
| 5,789,903 A | 8/1998 | Young et al. | |
| 5,811,890 A | 9/1998 | Hamamoto | |
| 5,850,136 A | 12/1998 | Kaneko | |
| 5,889,385 A | 3/1999 | Podrazhansky et al. | |
| 5,894,212 A | 4/1999 | Balogh | |
| 5,949,217 A | 9/1999 | Okada et al. | |
| 5,952,815 A | 9/1999 | Rouillard et al. | |
| 5,955,869 A | 9/1999 | Rathmann | |
| 5,994,873 A | 11/1999 | Shiojima | |

(Continued)

FOREIGN PATENT DOCUMENTS

| CN | 1713447 A | 12/2005 |
|---|---|---|
| EP | 0709943 A2 | 5/1996 |

(Continued)

*Primary Examiner* — Edward Tso
*Assistant Examiner* — Johali Torres Ruiz

(57) ABSTRACT

Embodiments of the invention provided circuits and methods for balancing battery cells. According to a first embodiment, a cell balancing circuit includes an auxiliary current path for controlling a conductance status of a shunt path. According to a second embodiment, a cell balancing circuit utilizes a total voltage of multiple neighboring cells in a battery pack to generate a current. Based on the current, a voltage drop is generated to conduct a shunt path corresponding to one cell of the neighboring cells. According to a third embodiment, a cell balancing circuit utilizes a total voltage of multiple neighboring cells in a battery pack to generate a current. Based on the current, a voltage drop is generated to conduct a shunt path corresponding to one cell of the neighboring cells. The cell balancing circuit can turn on multiple internal switches at the same time to balance multiple neighboring cells simultaneously.

11 Claims, 8 Drawing Sheets

(56) References Cited

U.S. PATENT DOCUMENTS

| | | |
|---|---|---|
| 6,037,751 A | 3/2000 | Klang |
| 6,064,179 A | 5/2000 | Ito et al. |
| 6,114,835 A | 9/2000 | Price |
| 6,150,795 A | 11/2000 | Kutkut et al. |
| 6,157,169 A | 12/2000 | Lee |
| 6,268,710 B1 | 7/2001 | Koga |
| 6,285,161 B1 | 9/2001 | Popescu |
| 6,288,520 B1 | 9/2001 | Kim |
| 6,329,796 B1 | 12/2001 | Popescu |
| 6,437,540 B2 | 8/2002 | Sonobe |
| 6,694,129 B2 | 2/2004 | Peterzell et al. |
| 6,744,394 B2 | 6/2004 | Liu et al. |
| 6,762,588 B2 | 7/2004 | Miyazaki et al. |
| 6,891,355 B2 | 5/2005 | Kernahan |
| 7,081,737 B2 | 7/2006 | Liu et al. |
| 7,336,055 B2 | 2/2008 | Ishishita |
| 7,696,725 B2 | 4/2010 | Liu et al. |
| 8,154,250 B2 | 4/2012 | Yu et al. |
| 2002/0105304 A1 | 8/2002 | Hald et al. |
| 2004/0041569 A1 | 3/2004 | Furukawa |
| 2004/0113586 A1 | 6/2004 | Chen |
| 2006/0091854 A1* | 5/2006 | Chen et al. ............ 320/116 |
| 2006/0208850 A1 | 9/2006 | Ikeuchi et al. |
| 2007/0188138 A1* | 8/2007 | Kobayashi ............ 320/119 |
| 2009/0091293 A1* | 4/2009 | Wang et al. ........... 320/118 |
| 2010/0033128 A1* | 2/2010 | Densham et al. ...... 320/116 |

FOREIGN PATENT DOCUMENTS

| | | |
|---|---|---|
| JP | 6265609 A | 9/1994 |
| JP | 08019188 A | 1/1996 |
| JP | 10164765 A | 6/1998 |
| JP | 11355966 A | 12/1999 |
| JP | 2000092732 A | 3/2000 |
| JP | 2001268810 A | 9/2001 |
| JP | 2002223525 A | 8/2002 |
| JP | 2002243771 A | 8/2002 |
| KR | 20030021666 A | 3/2003 |
| TW | 201001870 A | 1/2010 |
| TW | 201034338 A | 9/2010 |

* cited by examiner

CIRCUIT AND METHOD FOR BALANCING BATTERY CELLS

RELATED APPLICATIONS

This application claims priority to U.S. provisional application Ser. No. 61/311,872, filed on Mar. 9, 2010, which is hereby incorporated by reference in its entirety.

BACKGROUND

Used as a DC voltage power supply, a battery pack may include a group of battery cells connected in series. Charging and discharging the battery pack through normal operation over time may result in cell-to-cell variations in cell voltages. When one or more cells in a series string charge faster or slower than the others, an unbalanced condition may occur.

FIG. 1 illustrates a conventional cell balancing circuit 100. Multiple cells connected in series include a first cell 102 and a second cell 103. The positive terminal (anode) of the cell 102 is coupled to a controller 110 at a terminal BAT1 through a resistor 108. The negative terminal (cathode) of the cell 102 is coupled to the controller 110 at a terminal BAT0 through a resistor 106. Inside the controller 110, an internal shunt path (bypass path) is parallel-connected with the cell 102. The internal shunt path includes a bleeding control switch 104. The bleeding control switch 104 is controlled by the controller 110 through a control signal DRV1. Similarly, the anode of the cell 103 is coupled to the controller 110 at the terminal BAT2 through a resistor 112. The cathode of the cell 103 is coupled to the controller 110 at the terminal BAT1 through the resistor 108. Inside the controller 110, an internal shunt path is parallel-connected with the cell 103. The internal shunt path includes a bleeding control switch 116. The bleeding control switch 116 is controlled by the controller 110 through a control signal DRV2.

When an unbalanced condition occurs, for example, when a voltage of the cell 102 is greater than that of any other cell in the battery pack, the controller 110 may turn on the switch 104 to enable a bypass current (shunt current) to flow through the internal shunt path, and thus charging of the cell 102 can be slowed down and the cell voltages can be balanced in the battery pack. One of the disadvantages of this method is that the heat generated by the bypass current may accumulate inside the controller 110 and may cause damage to the controller 110.

FIG. 2 shows another conventional cell balancing circuit 200. Elements labeled the same as in FIG. 1 have similar functions. The anode of the cell 102 is coupled to a controller 210 at a terminal BAT1 through a resistor 208. The cathode of the cell 102 is coupled to the controller 210 at a terminal BAT0 through a resistor 206. An external shunt path is parallel-connected with the cell 102. The shunt path includes a resistor 201 and a bleeding control switch 204, e.g., an N channel metal oxide semiconductor field effect transistor (NMOSFET), connected in series with the resistor 201. The bleeding control switch 204 is controlled by the controller 210 via a dedicated pin CB1. Similarly, the anode of the cell 103 is coupled to the controller 210 at the terminal BAT2 through a resistor 212. The cathode of the cell 103 is coupled to the controller 210 at the terminal BAT1 through the resistor 208. An external shunt path is parallel-connected with the cell 103. The external shunt path includes a resistor 214 and a bleeding control switch 216, e.g., an NMOSFET, connected in series with the resistor 214. The bleeding control switch 216 is controlled by the controller 210 via a dedicated pin CB2.

When an unbalanced condition occurs, for example, when a voltage of the cell 102 is greater than that of any other cell in the battery pack, the controller 210 may turn on the switch 204 to enable a bypass current to flow through the external shunt path, and thus charging of the cell 102 can be slowed down and the cell voltages can be balanced in the battery pack. One of the disadvantages of this method is that each cell needs an extra pin (e.g., CB1 for cell 102, CB2 for cell 103) to control a corresponding bleeding control switch, which increases the cost.

FIG. 3 shows another conventional cell balancing circuit 300. Elements labeled the same as in FIG. 1 and FIG. 2 have similar functions. In the conventional cell balancing circuit 300, the anode of the cell 102 is coupled to a controller 310 at a terminal BAT1 through a resistor 308. The cathode of the cell 102 is coupled to the controller 310 at a terminal BAT0 through a resistor 306. An external shunt path is parallel-connected with the cell 102. The shunt path can include a resistor 301 and a bleeding control switch (e.g., a bipolar junction transistor 302) connected in series with the resistor 301. The conductance status of the bipolar junction transistor 302 is determined by the voltage drop across the resistor 306. Similarly, the anode of the cell 103 is coupled to the controller 310 at a terminal BAT2 through a resistor 313. The cathode of the cell 103 is coupled to the controller 310 at the terminal BAT1 through the resistor 308. An external shunt path is parallel-connected with the cell 103. The shunt path can include a resistor 314 and a bleeding control switch (e.g., a bipolar junction transistor 304) connected in series with the resistor 314. The conductance status of the bipolar junction transistor 304 is determined by the voltage drop across the resistor 308.

In the controller 310, an internal switch 312 is coupled between the terminal BAT1 and the terminal BAT0. An internal switch 316 is coupled between the terminal BAT2 and the terminal BAT1. The internal switch 312 is controlled by the controller 310 through a control signal DRV1. The internal switch 316 is controlled by the controller 310 through a control signal DRV2.

In FIG. 3, in order to conduct the shunt path of the cell 102, the internal switch 312 is turned on to enable a current $I_2$ flowing from the anode of the cell 102 through the resistor 308 and the terminal BAT1 into the controller 310. In order to conduct the shunt path of the cell 103, the internal switch 316 is turned on to enable a current $I_3$ flowing out of the controller 310 through the terminal BAT1, the resistor 308 to the cathode of the cell 103. As a result, there may be a confliction of the current direction regarding the current flowing through the resistor 308. Since $I_2$ and $I_3$ flow in opposite directions, if the level of $I_2$ and the level of $I_3$ are the same, the voltage drop across the resistor 308 will be zero such that the bipolar junction transistor 304 can not be turned on. Therefore, this conventional cell balancing circuit 300 is not able to balance two neighboring cells at the same time.

Moreover, the bypass current flowing through a shunt path is limited by a base current of a corresponding bipolar junction transistor. For example, if the cell 103 is unbalanced, the internal switch 316 is turned on and the internal switch 312 is turned off. A current $I_1$ flows from the anode of the cell 103 through the resistor 313, the terminal BAT2 and the internal switch 316 to the terminal BAT1. The base current $I_B$ of the bipolar junction transistor 304 flows into the bipolar junction transistor 304. The current $I_3$ flows through the resistor 308 to the cathode of the cell 103. The bypass current $I_{BLD}$ flowing through the shunt path of the cell 103 can be given by:

$$I_{BLD} = \beta \cdot I_B, \quad (1)$$

where β is the common-emitter current gain of the bipolar junction transistor 304. In order to acquire a relatively large bypass current $I_{BLD}$, the base current $I_B$ needs to be increased. However, since the current $I_1$ is the summation of the base current $I_B$ and the current $I_3$ flowing through the resistor 308, a relatively large base current $I_B$ may result in a relatively small current $I_3$. On the other hand, the current $I_3$ needs to be large enough such that the voltage drop across the resistor 308 is large enough to turn on the bipolar junction transistor 304. Therefore, the bypass current $I_{BLD}$ flowing through the shunt path of the cell 103 is limited by the base current $I_B$ of the bipolar junction transistor 304.

Furthermore, the conventional cell balancing circuit 300 may not be suitable for balancing cells having relatively low cell voltages. Assume that the resistance of the resistor 308 and the resistance of the resistor 306 are the same. If the cell 102 is unbalanced, the controller 310 turns on the internal switch 312 by the control signal DRV1. Neglecting the voltage drop across the internal switch 312, the voltage drop across the resistor 306 is only half of the voltage of the cell CELL-1. If the voltage of the cell CELL-1 is too low, the bleeding control switch (the bipolar junction transistor 302) in the shunt path may not be turned on.

SUMMARY

Embodiments of the invention provided circuits and methods for balancing battery cells.

According to a first embodiment of the invention, there is provided a cell balancing circuit which includes a shunt path for enabling a bypass current of a cell and an auxiliary current path coupled in parallel with the shunt path. The auxiliary current path can control a conductance status of the shunt path.

According to a second embodiment of the invention, there is provided a cell balancing circuit which can utilize a total voltage of multiple neighboring cells in a battery pack to generate a current. A voltage drop across a resistor is generated based on the current. A shunt path corresponding to one cell of the neighboring cells can be conducted in response to the voltage drop.

According to a third embodiment of the invention, there is provided a cell balancing circuit which can utilize a total voltage of multiple neighboring cells in a battery pack to generate a current. A voltage drop across a resistor is generated based on the current. A shunt path corresponding to one cell of the neighboring cells can be conducted in response to the voltage drop. Furthermore, the cell balancing circuit can turn on multiple internal switches at the same time to balance multiple neighboring cells simultaneously.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the invention provided circuits and methods that can balance battery cells even if the voltages of these battery cells are relatively low. Moreover, in one embodiment, neighboring cells can be balanced simultaneously. The circuits and methods according to present invention are not limited to any specific battery types and can be used for Li-Ion cells, Lead Acid battery cells, NiMH battery cells, solar cells, etc.

Figure 1:
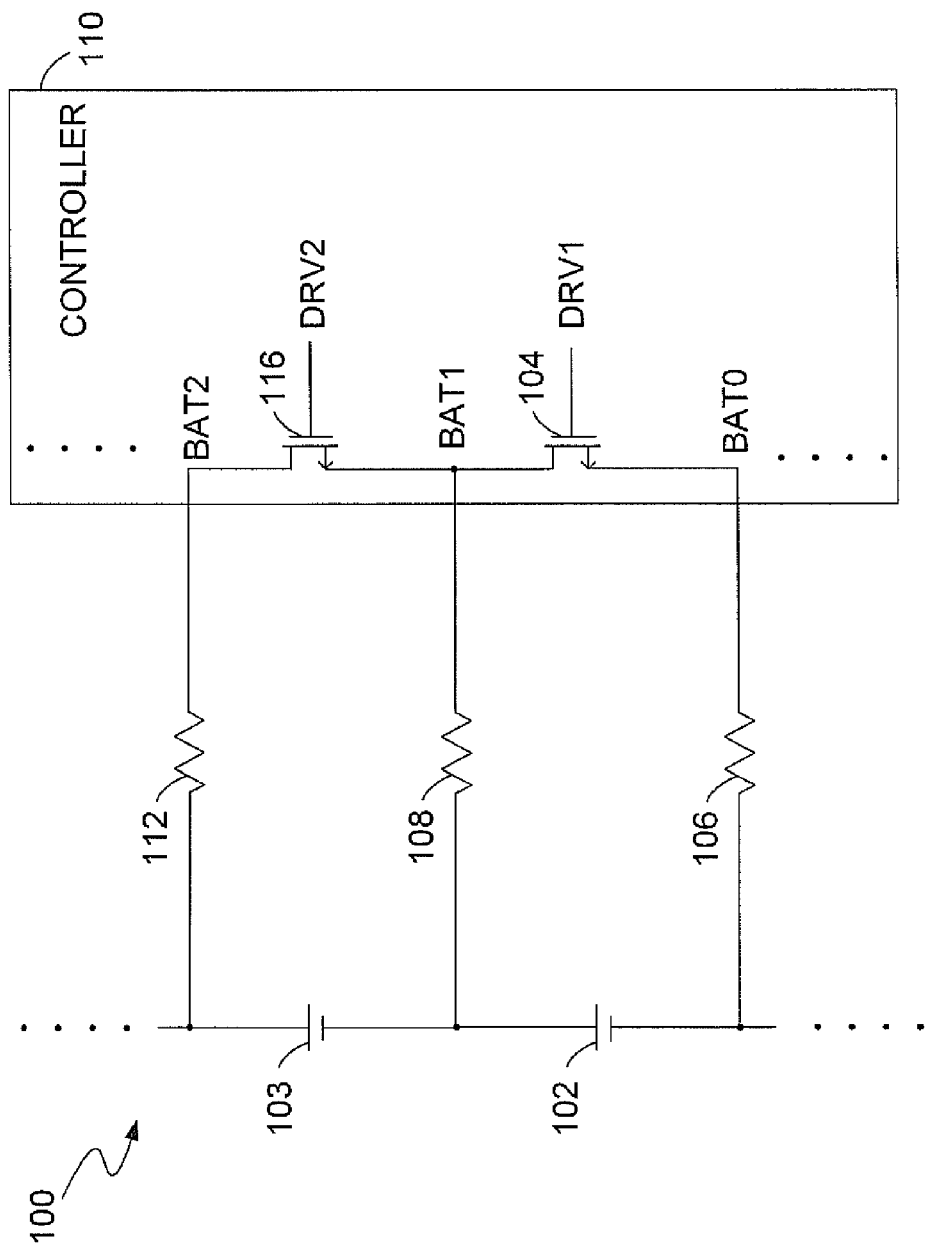
FIG. 1 illustrates a conventional cell balancing circuit.
Figure 2:
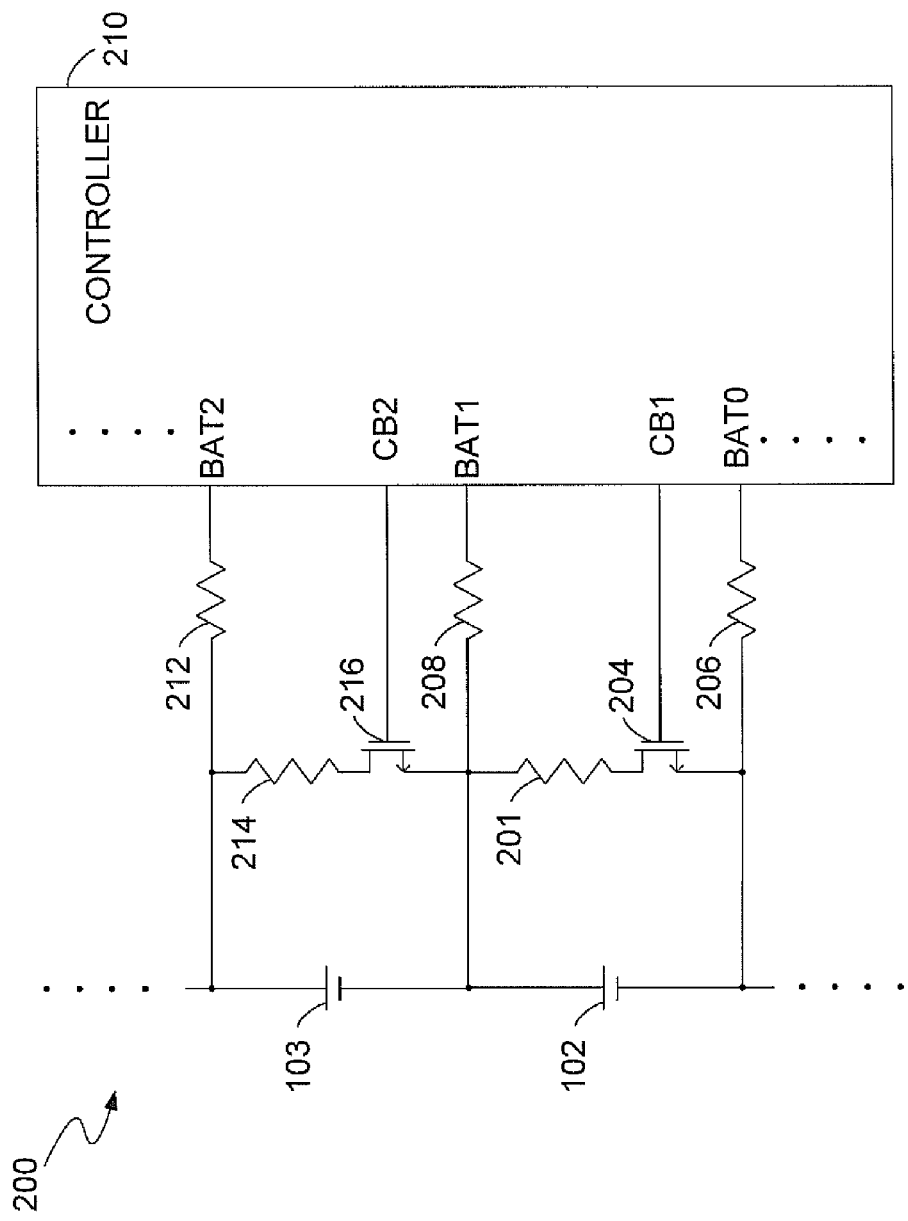
FIG. 2 illustrates another conventional cell balancing circuit.
Figure 3:
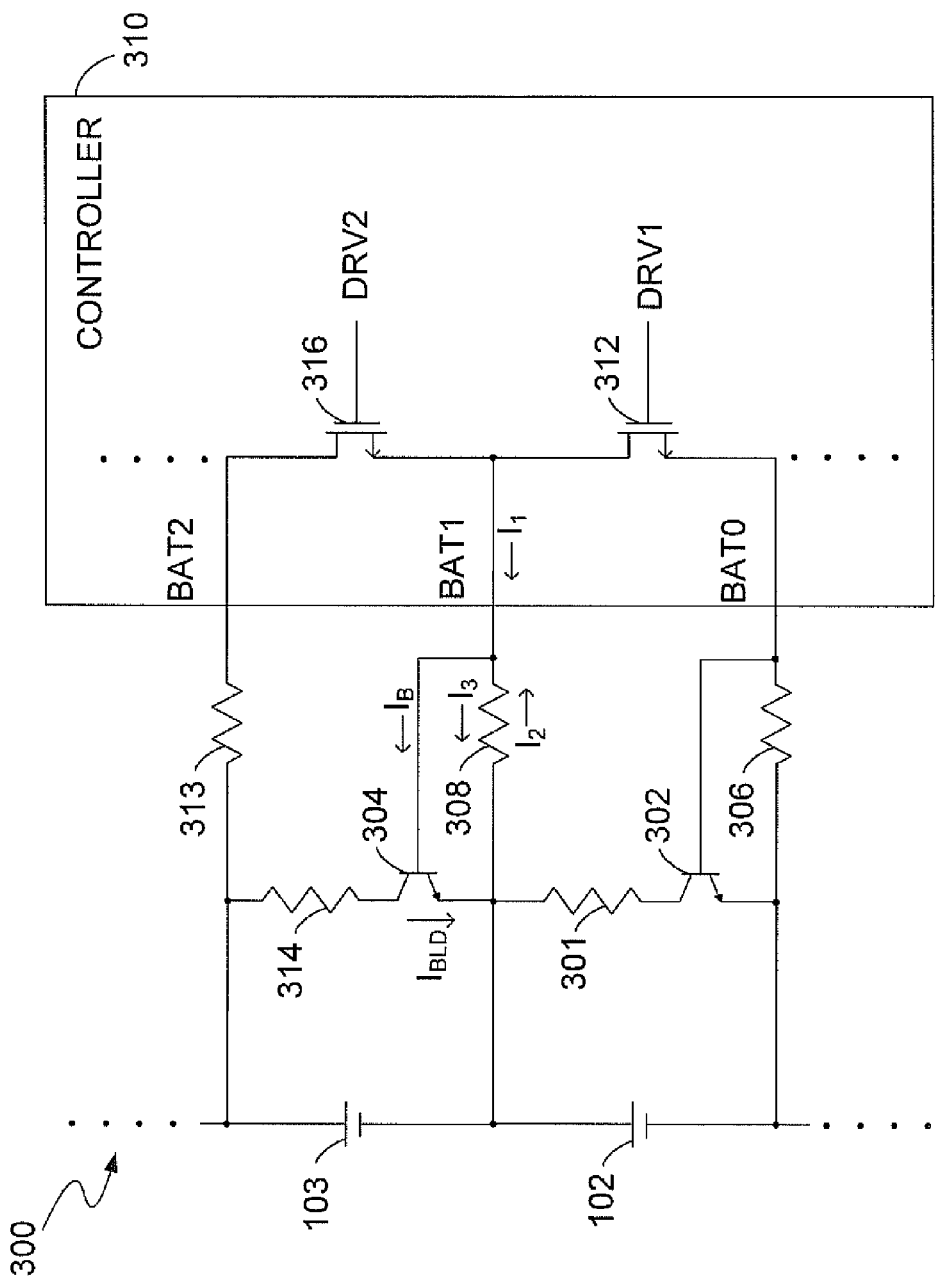
FIG. 3 illustrates another conventional cell balancing circuit.
Figure 4:
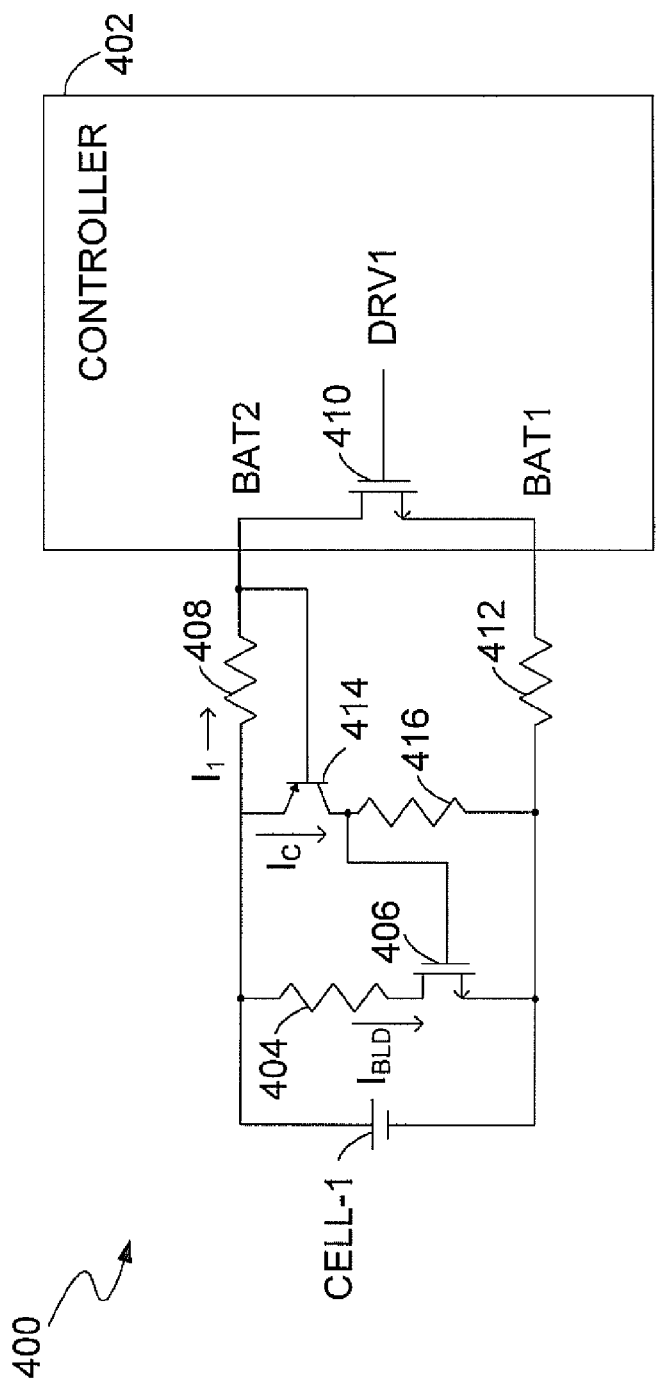
FIG. 4 illustrates a cell balancing circuit, in accordance with one embodiment of the present invention.

FIG. 4 illustrates a cell balancing circuit 400 for a battery cell CELL-1, in accordance with one embodiment of the present invention. The balancing circuit 400 includes a shunt path and an auxiliary current path coupled in parallel with the shunt path, and a third current path coupled in parallel with the auxiliary current path. The shunt path is operable for enabling a bypass current of the cell CELL-1 in a battery pack. The auxiliary current path controls a conductance status of the shunt path. The third current path controls a conductance status of the auxiliary current path.

In the example of FIG. 4, the anode of the cell CELL-1 is coupled to a controller 402 at a terminal BAT2 through a resistor 408. The cathode of the cell CELL-1 is coupled to the controller 402 at the terminal BAT1 through a resistor 412. In one embodiment, the shunt path of the cell CELL-1 includes a bleeding control switch 406 and a resistor 404 coupled in series. In one embodiment, the auxiliary current path includes a switch, e.g., a bipolar junction transistor 414, and a resistor 416 coupled in series. The conductance status of the bleeding control switch 406 is determined by the voltage drop across the resistor 416. The conductance status of the bipolar junction transistor 414 is determined by its base-emitter voltage $V_{BE}$, which is substantially equal to a voltage drop across the resistor 408 which is coupled between the auxiliary current path and the third current path. The third current path includes an internal switch 410 which is coupled between the terminal BAT2 and the terminal BAT1. The internal switch 410 is controlled by the controller 402 through a control signal DRV1. In the example of FIG. 4, the shunt path and the auxiliary current path are outside the controller 402, and the third current path is inside the controller 402. The controller 402 can be used to control a charging and/or discharging of the battery pack, and can be used to perform various protection functions (e.g., over-voltage protection, over-current protection, under-voltage protection, cell balancing) for the battery pack. In one embodiment, the controller 402 can be integrated in the battery pack.

In operation, if the cell CELL-1 is unbalanced (e.g., the cell voltage of the cell CELL-1 is higher than a threshold, or the cell voltage of the cell CELL-1 is higher than any other cell in the same battery pack), the controller 402 conducts the third current path. The auxiliary current path is conducted to enable a current flowing through the auxiliary current path in response to the current flowing through the third current path. The shunt path is conducted to enable a bypass current of the cell CELL-1 in response to the current flowing through the auxiliary current path.

More specifically, if an unbalanced condition occurs to the cell CELL-1, the internal switch 410 is turned on by the controller 402 to conduct the third current path to enable a current flowing through the third current path. A current $I_1$ flows from the anode of the cell CELL-1 through the resistor 408, the terminal BAT2, the internal switch 410, the terminal BAT1 and the resistor 412 to the cathode of the cell CELL-1. If the voltage across the resistor 408 (i.e., the base-emitter voltage $V_{BE}$ of the bipolar junction transistor 414) is greater than the turn-on voltage $V_{BJT-ON}$ of the bipolar junction transistor 414, the bipolar junction transistor 414 is turned on such that the auxiliary current path is conducted and a current $I_C$ flows through the auxiliary current path. If the resistance of the resistor 416 is relatively large, the voltage drop across the resistor 416 is close to the cell voltage of the cell CELL-1. In one embodiment, the bleeding control switch 406 is an N channel metal oxide semiconductor field effect transistor (NMOSFET). If the voltage across the resistor 416 is greater than the turn-on voltage $V_{MOS-ON}$ of the bleeding control switch 406, the bleeding control switch 406 is turned on, so that a bypass current $I_{BLD}$ is enabled to flow through the shunt path.

Advantageously, the bypass current $I_{BLD}$ is not limited by the base current of the bipolar junction transistor 408. By adjusting the resistance of the resistor 404, the bypass current $I_{BLD}$ can be adjusted within a desired range. Moreover, the cell balancing circuit 400 is able to balancing cells even if the cells have relatively low cell voltages. If the resistance of the resistor 416 is relatively large, the voltage drop across the resistor 416 is close to the cell voltage of the cell CELL-1, and thus the bleeding control switch 406 can be turned on even if the voltage of the cell CELL-1 is relatively low.

Figure 5:
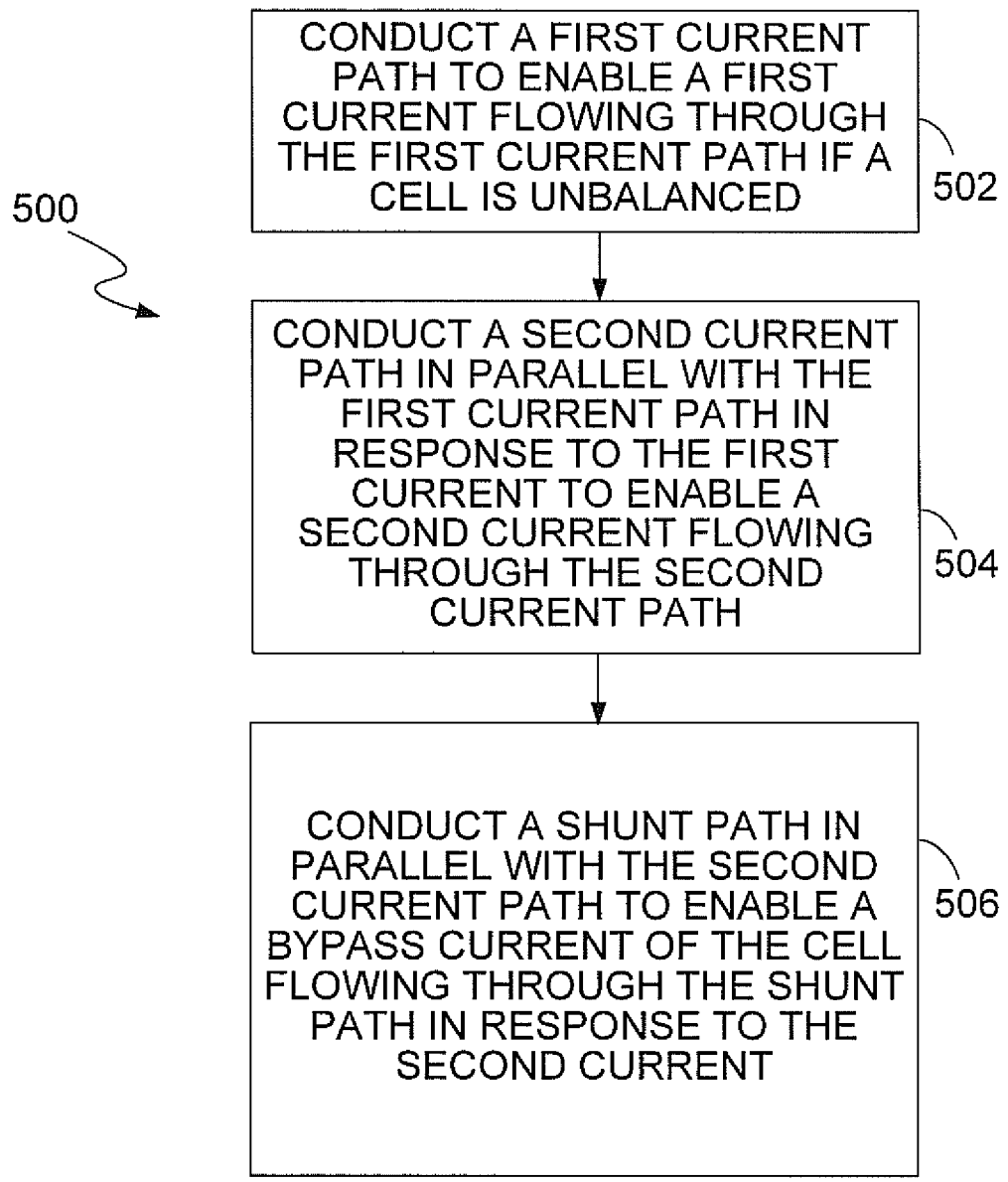
FIG. 5 illustrates a flowchart of a method for balancing a cell, in accordance with one embodiment of the present invention.

FIG. 5 illustrates a flowchart 500 of a method for balancing a cell, in accordance with one embodiment of the present invention. FIG. 5 is described in combination with FIG. 4. In block 502, a first current path (e.g., a current path inside a controller 402) is conducted to enable a first current $I_1$ to flow through the first current path if a cell CELL-1 is unbalanced. In block 504, a second current path (e.g., the auxiliary current path) in parallel with the first current path is conducted to enable a second current $I_C$ flowing through the second current path in response to the first current $I_1$. In block 506, a shunt path in parallel with the second current path is conducted to enable a bypass current $I_{BLD}$ flowing through the shunt path in response to the second current $I_C$.

Figure 6:
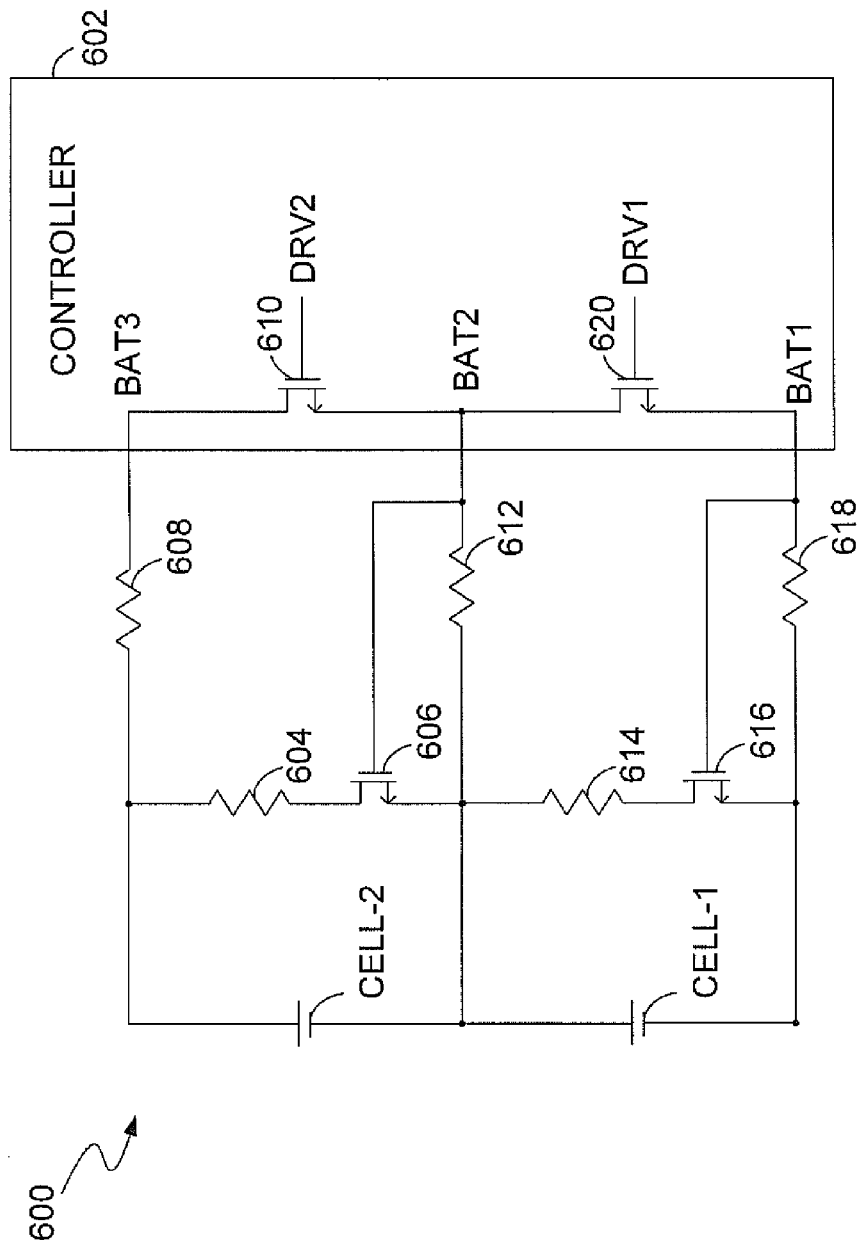
FIG. 6 illustrates a cell balancing circuit, in accordance with one embodiment of the present invention.

FIG. 6 illustrates a cell balancing circuit 600, in accordance with one embodiment of the present invention. The cell balancing circuit 600 is operable for utilizing a total voltage of multiple neighboring cells in a battery pack to generate a current. A voltage drop across a resistor is generated based on the current. A shunt path corresponding to one cell of the neighboring cells can be conducted in response to the voltage drop. In the example of FIG. 6, a total voltage of two neighboring cells is utilized to generate the current. However, the present invention is not so limited. The cell balancing circuit 600 can utilize a total voltage of three or more cells to generate the current.

In the example of FIG. 6, two neighboring cells CELL-1 and CELL-2 are coupled to a controller 602. The anode of the cell CELL-1 is coupled to the controller 602 at a terminal BAT2 through a resistive element, e.g., resistor 612. The cathode of the cell CELL-1 is coupled to the controller 602 at a terminal BAT1 through a resistive element, e.g., a resistor 618. A shunt path which includes a resistor 614 and a bleeding control switch 616 is coupled in parallel with the cell CELL-1. Similarly, the anode of the cell CELL-2 is coupled to the controller 602 at a terminal BAT3 through a resistor 608. The cathode of the cell CELL-2 is coupled to the controller 602 at the terminal BAT2 through the resistor 612. A shunt path which includes a resistor 604 and a bleeding control switch 606 is coupled in parallel with the cell CELL-2. In the controller 602, a current path is coupled in parallel with cells CELL-1 and CELL-2. The current path includes an internal switch 620 coupled between the terminal BAT2 and the terminal BAT1 and an internal switch 610 coupled between the terminal BAT3 and the terminal BAT2. The internal switch 620 is controlled by the controller 602 through a control signal DRV1. The internal switch 610 is controlled by the controller 602 through a control signal DRV2.

In operation, if an unbalanced condition occurs to the cell CELL-1, the controller 602 is operable for conducting the current path to generate a current flowing through the current path according to a total voltage of cells CELL-1 and CELL-2. In the example of FIG. 6, the controller 602 turns on the internal switch 610 and the internal switch 620 simultaneously. The current generated based on the total voltage of the neighboring cells CELL-1 and CELL-2 flows through the resistor 618 to produce a voltage drop on the resistor 618. The conductance of the shunt path in parallel with the cell CELL-1 is determined by the voltage drop on the resistor 618. More specifically, the current generated based on the total voltage of the neighboring cells CELL-1 and CELL-2 flows from the anode of the cell CELL-2 through the resistor 608, the internal switch 610, the internal switch 620, the resistor 618 to the cathode of the cell CELL-1. Assuming that the resistance of the resistor 608 and the resistance of the resistor 618 are the same, and neglecting a current flowing through the resistor 612 and the resistance of the internal switches 610 and 620, the voltage drop $V_R$ across the resistor 618 can be given by:

$$V_R = \frac{(V_{CELL-1} + V_{CELL-2})}{2}, \tag{2}$$

where $V_{CELL-1}$ is the voltage of the cell CELL-1 and $V_{CELL-2}$ is the voltage of the cell CELL-2.

Thus, the cell balancing circuit 600 utilizing a total voltage of two neighboring cells CELL-1 and CELL-2 to generate a voltage drop across the resistor 618. As such, even if the voltage of the cell CELL-1 is relatively low, the voltage drop $V_R$ across the resistor 618 can still be large enough to turn on the bleeding control switch 616. Advantageously, the cell balancing circuit 600 can be used to balance cells even if the cells have relatively low cell voltages.

Figure 7:
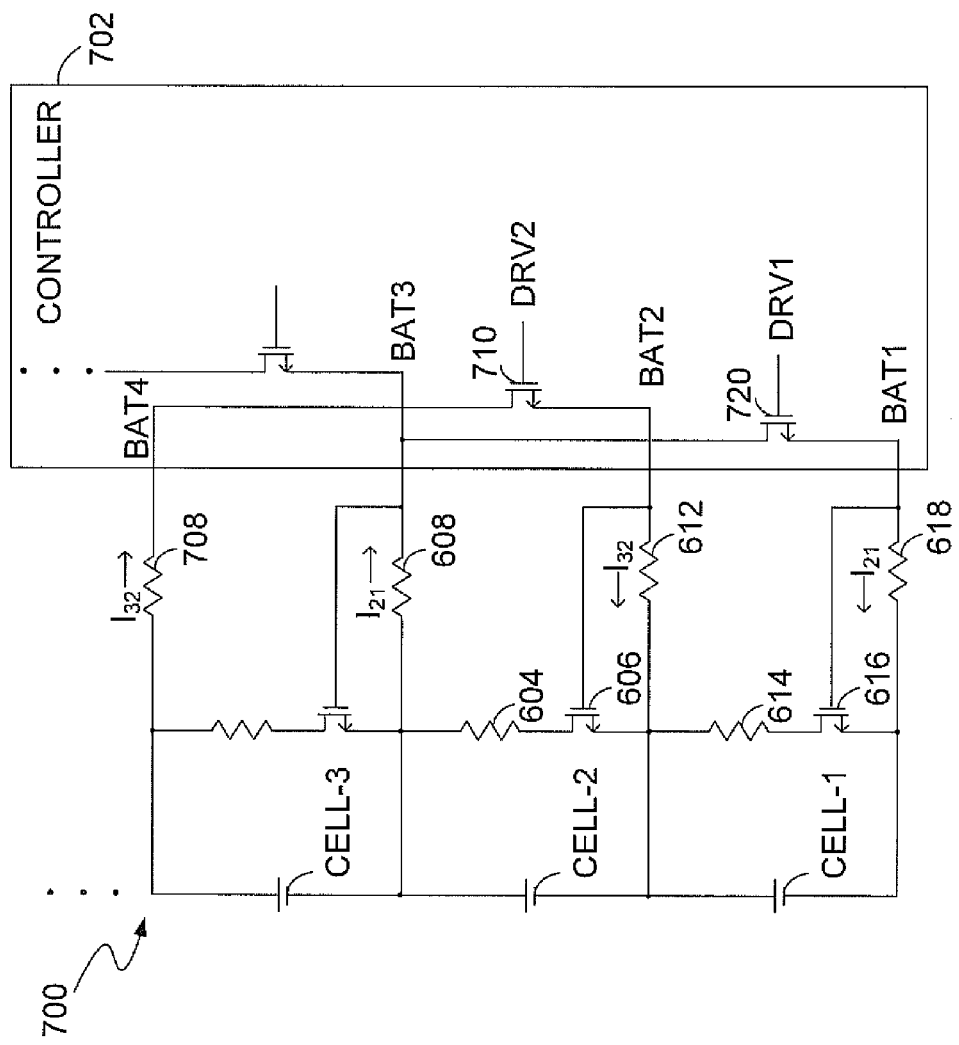
FIG. 7 illustrates a cell balancing circuit, in accordance with one embodiment of the present invention.

FIG. 7 illustrates a cell balancing circuit 700, in accordance with one embodiment of the present invention. The cell balancing circuit 700 is operable for utilizing a total voltage of multiple neighboring cells in a battery pack to generate a current. A voltage drop across a resistor is generated based on the current. A shunt path corresponding to one cell of the neighboring cells can be conducted in response to the voltage drop. In the example of FIG. 7, a total voltage of two neighboring cells is utilized to generate the current. However, the present invention is not so limited. The cell balancing circuit 700 can utilize a total voltage of three or more cells to generate the current. Furthermore, the cell balancing circuit can turn on multiple internal switches at the same time to balance multiple neighboring cells simultaneously. Elements labeled the same as in FIG. 6 have similar functions.

In the example of FIG. 7, three neighboring cells CELL-1, CELL-2 and CELL-3 are coupled in series. The anode of the cell CELL-1 is coupled to the cathode of the cell CELL-2. The anode of the cell CELL-2 is coupled to the cathode of the cell CELL-3. The anode of the cell CELL-1 is coupled to the controller 702 at the terminal BAT2 through the resistor 612. The cathode of the cell CELL-1 is coupled to the controller 702 at the terminal BAT1 through the resistor 618. The anode of the cell CELL-2 is coupled to the controller 702 at the terminal BAT3 through the resistor 608. The cathode of the cell CELL-2 is coupled to the controller 702 at the terminal BAT2 through the resistor 612. The anode of the cell CELL-3 is coupled to the controller 702 at the terminal BAT4 through a resistor 708. The cathode of the cell CELL-3 is coupled to the controller 702 at the terminal BAT3 through the resistor 608.

In the controller 702, a first current path is coupled in parallel with cells CELL-1 and CELL-2, and a second current path is coupled in parallel with cells CELL-2 and CELL-3. The first current path includes an internal switch 720 coupled in parallel with cells CELL-2 and CELL-1. More specifically, the internal switch 720 is coupled to the anode of the cell CELL-2 through the terminal BAT3 and is coupled to the cathode of the cell CELL-1 through the terminal BAT1. The second current path includes an internal switch 710 coupled in parallel with cells CELL-3 and CELL-2. More specifically, the internal switch 710 is coupled to the anode of the cell CELL-3 through the terminal BAT4 and is coupled to the cathode of the cell CELL-2 through the terminal BAT2.

In operation, if the cell CELL-1 is unbalanced, the controller 702 turns on the internal switch 720 with a control signal DRV1 to conduct the first current path to generate a current flowing through the first current path generated according to a total voltage of the plurality of neighboring cells, e.g., CELL-1 and CELL-2 in the example of FIG. 7. The current generated according to a total voltage of the neighboring cells CELL-1 and CELL-2 flows through the resistor 618 to produce a voltage drop on the resistor 618. The conductance of the shunt path in parallel with the cell CELL-1 is determined by the voltage drop on the resistor 618. More specifically, when the internal switch 720 is turned on, a current $I_{21}$ is enabled to flow from the anode of the cell CELL-2 to the cathode of the cell CELL-1 through the resistor 608, the internal switch 720 and the resistor 618. The current $I_{21}$ is generated based on a total voltage of the two neighboring cells CELL-1 and CELL-2. A voltage drop across the resistor 618 can turn on the bleeding control switch 616, and thus the shun path corresponding to the cell CELL-1 can be conducted. Similarly, if the cell CELL-2 is unbalanced, the controller 702 turns on the internal switch 710 with a control signal DRV2 to conduct the second current path. When the internal switch 710 is turned on, a current $I_{32}$ is enabled to flow from the anode of the cell CELL-3 to the cathode of the cell CELL-2 through the resistor 808, the internal switch 710 and the resistor 612. The current $I_{32}$ is generated based on a total voltage of the two neighboring cells CELL-3 and CELL-2. A voltage drop across the resistor 612 can turn on the bleeding control switch 606, and thus the shunt path corresponding to the cell CELL-2 can be conducted.

Advantageously, when an internal switch is turned on to balance a cell (e.g., the cell CELL-1), a voltage drop across a corresponding resistor (e.g., the resistor 618) is relatively large because the current flowing through the resistor is generated based on a total voltage of multiple neighboring cells (e.g., the cells CELL-1 and CELL-2). Therefore, even if the voltage of the cell (e.g., the cell CELL-1) is relatively low, the corresponding bleeding control switch (e.g., the bleeding control switch 616) can still be turned on in response to the voltage across the resistor. Moreover, since there is no confliction of current direction, the controller 702 can turn on multiple internal switches (e.g., the internal switch 720 and the internal switch 710) at the same time to balance multiple neighboring cells (e.g., the cells CELL-1 and CELL-2) simultaneously.

Figure 8:
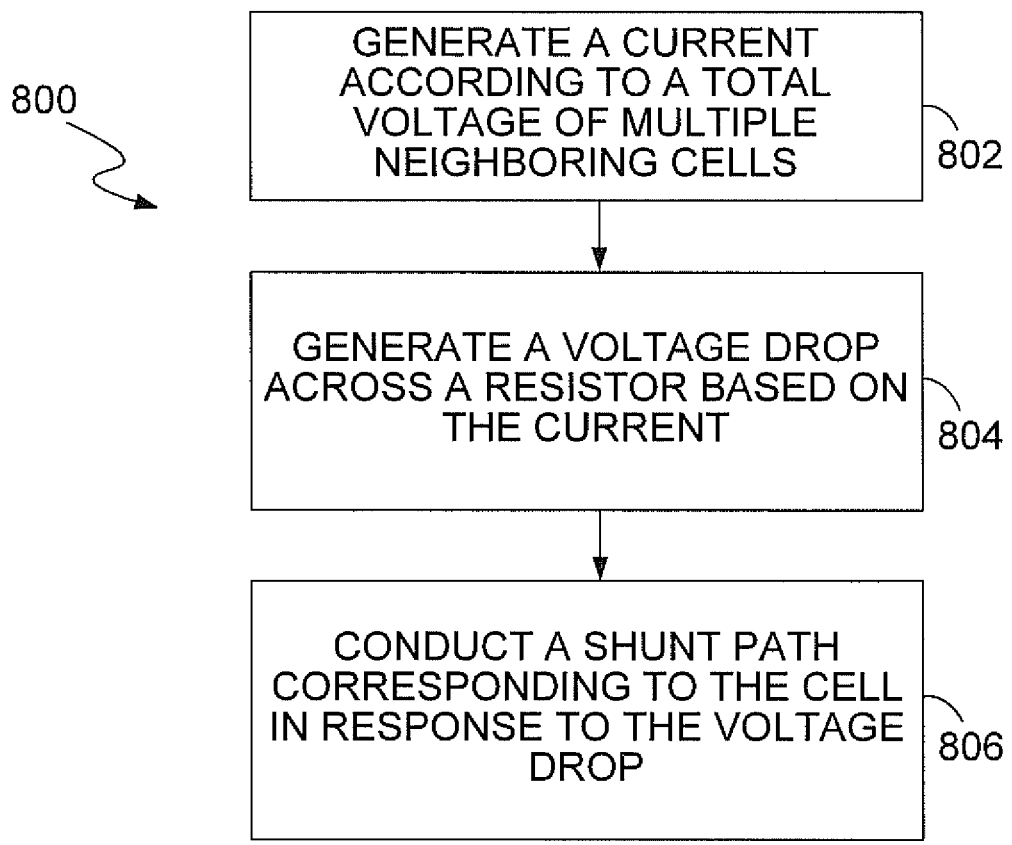
FIG. 8 illustrates a flowchart of a method for balancing a cell, in accordance with one embodiment of the present invention.

FIG. 8 illustrates a flowchart of a method 800 for balancing cell, in accordance with one embodiment of the present invention. FIG. 8 is described in combination with FIG. 6 and FIG. 7. In block 802, a current is generated according to a total voltage of multiple neighboring cells (e.g., the cells CELL-1 and CELL-2 in FIG. 6 or FIG. 7). In block 804, a voltage drop across a resistive element (e.g., the resistor 618 in FIG. 6 or FIG. 7) is generated based on the current. In block 806, a shunt path corresponding to a cell (e.g., the cell CELL-1 in FIG. 6 or FIG. 7) of the neighboring cells is conducted in response to the voltage drop. In one embodiment, a first switch (e.g., the switch 620 in FIG. 6) coupled in parallel with a first cell (e.g., the cell CELL-1 in FIG. 6) and a second switch (e.g., the switch 610 in FIG. 6) coupled in parallel with a second cell (e.g., the cell CELL-2 in FIG. 6) are turned on simultaneously to generate the current. In another embodiment, a switch (e.g., the switch 720 in FIG. 7) coupled in parallel with the multiple neighboring cells (e.g., the cells CELL-1 and CELL-2 in FIG. 7) is turned on to generate the current.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:
1. A cell balancing circuit comprising:
 a shunt path coupled to a cell for enabling a bypass current of said cell;
 an auxiliary current path coupled in parallel with said shunt path;
 a third current path coupled in parallel with said auxiliary current path; and
 a controller operable for conducting said third current path to enable a current flowing through said third current path if said cell is unbalanced, wherein said auxiliary current path is conducted to enable a current flowing through said auxiliary current path in response to said current flowing through said third current path, wherein said shunt path is conducted to enable said bypass current in response to said current flowing through said auxiliary current path.

2. The cell balancing circuit of claim 1, further comprising:
a resistor coupled between said auxiliary current path and said third current path,
wherein a current flows through said resistor to generate a voltage drop on said resistor if said third current path is conducted, and
wherein a conductance status of said auxiliary current path is determined by said voltage drop on said resistor.

3. The cell balancing circuit of claim 1, wherein said auxiliary current path comprises a first switch and a first resistor, wherein a current flows through said first resistor to generate a voltage drop on said first resistor if said third current path is conducted, wherein a conductance status of said shunt path is determined by said voltage drop on said first resistor.

4. The cell balancing circuit of claim 3, wherein said shunt path comprises a second resistor and a second switch, wherein a conductance status of said second switch is determined by said voltage drop on said first resistor.

5. The cell balancing circuit of claim 1, wherein said third current path is inside said controller, and wherein said shunt path and said auxiliary current path is outside said controller.

6. A method for balancing a cell, said method comprising:
conducting a first current path to enable a first current flowing through said first current path if said cell is unbalanced;
conducting a second current path in parallel with said first current path in response to said first current to enable a second current flowing through said second current path; and
conducting a shunt path in parallel with said second current path to enable a bypass current flowing from a first terminal of said cell through said shut path to a second terminal of said cell in response to said second current.

7. The method of claim 6, further comprising:
generating a first voltage drop across a first resistor based on said first current; and
conducting said second current path in response to said first voltage drop.

8. The method of claim 6, further comprising:
generating a second voltage drop across a second resistor based on said second current; and
conducting said shunt path in response to said second voltage drop.

9. A cell balancing circuit comprising:
a current path coupled in parallel with a plurality of neighboring cells comprising a first cell and a second cell;
a shunt path coupled in parallel with said first cell;
a controller operable for conducting said current path to generate a current flowing through said current path according to a total voltage of said plurality of neighboring cells if said first cell is unbalanced; and
a resistive element coupled between said current path and said first cell,
wherein said current flows through said resistive element to produce a voltage drop on said resistive element, and wherein a conductance status of said shunt path is determined by said voltage drop.

10. The cell balancing circuit of claim 9, wherein said current path comprises a first switch coupled in parallel with said first cell and a second switch coupled in parallel with said second cell, wherein said controller is operable for turning on said first switch and said second switch simultaneously to generate said current.

11. The cell balancing circuit of claim 9, wherein said current path comprises a switch coupled in parallel with said plurality of neighboring cells, wherein said controller is operable for turning on said switch to generate said current.

* * * * *